US012771660B2

(12) United States Patent
Mitchell et al.

(10) Patent No.: US 12,771,660 B2
(45) Date of Patent: Oct. 20, 2026

(54) DETECTING DRIFT IN MESSAGING CONTENT COMPLIANCE

(71) Applicant: Twilio Inc., San Francisco, CA (US)

(72) Inventors: Christopher KJ Mitchell, North Vancouver (CA); Paul Wheeler, Oakville (CA)

(73) Assignee: Twilio Inc., San Francisco, CA (US)

( * ) Notice: Subject to any disclaimer, the term of this patent is extended or adjusted under 35 U.S.C. 154(b) by 59 days.

(21) Appl. No.: 18/409,005

(22) Filed: Jan. 10, 2024

(65) Prior Publication Data

US 2025/0227080 A1 Jul. 10, 2025

(51) Int. Cl.
*H04L 51/063* (2022.01)
*H04L 51/02* (2022.01)
*H04L 51/212* (2022.01)

(52) U.S. Cl.
CPC ............ *H04L 51/063* (2013.01); *H04L 51/02* (2013.01); *H04L 51/212* (2022.05)

(58) Field of Classification Search
CPC ..... G06Q 10/107; H04L 51/04; H04L 51/063; H04L 51/10; H04L 51/21; H04L 51/212; H04L 51/214; H04L 51/216; H04L 51/42; H04L 51/52; H04W 4/14; H04W 4/23
See application file for complete search history.

(56) References Cited

U.S. PATENT DOCUMENTS 7,756,535 B1 * 7/2010 Diao ..................... H04L 51/212 709/206
9,154,514 B1 * 10/2015 Prakash ................ H04L 51/212
10,498,678 B2 12/2019 Murtagh
11,677,782 B2 6/2023 Lee
12,022,364 B1 * 6/2024 Reissner ................ H04W 4/14
(Continued)

OTHER PUBLICATIONS

Egele, Manuel, et al. "Towards Detecting Compromised Accounts on Social Networks." IEEE Transactions on Dependable and Secure Computing 14.04 (2017): 447-460. (Year: 2017).*
(Continued)

*Primary Examiner* — Vivek Srivastava
*Assistant Examiner* — William C Mcbeth
(74) *Attorney, Agent, or Firm* — Lowenstein Sandler LLP

(57) ABSTRACT

An example method of analyzing messaging content includes: receiving first messaging content comprising a first plurality of messages originated by a specified message-originating entity; determining, for each subset of the first messaging content corresponding to a respective use case, a respective baseline; receiving second messaging content comprising a second plurality of messages originated by the specified message-originating entity; classifying the second messaging content into respective one or more portions corresponding to one or more use cases associated with the specified message-originating entity; comparing each portion of the second messaging content to a baseline associated with a corresponding use case; responsive to determining that a value of a metric reflecting a difference between a portion of the second messaging content and a baseline associated with a corresponding use case exceeds a corresponding maximum allowable variability threshold, performing a remedial action with respect to the portion of the second messaging content.

17 Claims, 4 Drawing Sheets

(56) References Cited

U.S. PATENT DOCUMENTS

| | | | | |
|---|---|---|---|---|
| 2003/0009526 | A1* | 1/2003 | Bellegarda | H04L 51/212 709/206 |
| 2003/0167402 | A1* | 9/2003 | Stolfo | H04L 51/212 726/23 |
| 2005/0076084 | A1* | 4/2005 | Loughmiller | H04L 51/212 706/20 |
| 2018/0152471 | A1* | 5/2018 | Jakobsson | H04L 63/1425 |
| 2019/0149501 | A1* | 5/2019 | Bastide | H04L 51/52 709/206 |
| 2020/0344251 | A1* | 10/2020 | Jeyakumar | H04L 51/212 |
| 2020/0374251 | A1* | 11/2020 | Warshaw | H04L 51/212 |
| 2021/0266294 | A1* | 8/2021 | Chechik | H04L 51/212 |
| 2021/0271741 | A1* | 9/2021 | Habal | G06F 21/316 |
| 2021/0336983 | A1* | 10/2021 | Lee | H04L 51/212 |
| 2022/0400094 | A1* | 12/2022 | Sampath | H04L 51/212 |
| 2023/0236918 | A1 | 7/2023 | Pachamuthu | |
| 2024/0013258 | A1* | 1/2024 | Nagargoje | H04L 51/212 |
| 2026/0113341 | A1* | 4/2026 | Kennedy | H04L 51/212 |

OTHER PUBLICATIONS

Soonthornphisaj, Nuanwan, Kanokwan Chaikulseriwat, and Piyanan Tang-On. "Anti-spam filtering: a centroid-based classification approach." 6th International Conference on Signal Processing, 2002.. vol. 2. IEEE, 2002. (Year: 2002).*

Augmented SBERT—Sentence-Transformers documentation, 4 pages, retrieved from the internet on Jan. 10, 2024.

Transformers, MPNet, "Join the Hugging Face community", 36 pages, retrieved from the internet on Jan. 10, 2024.

* cited by examiner

DETECTING DRIFT IN MESSAGING CONTENT COMPLIANCE

TECHNICAL FIELD

Aspects and implementations of the disclosure relate to computer networking, and more specifically, to systems and methods for detecting drift in messaging content compliance.

BACKGROUND

Instant messaging (IM) technology allows real-time transmission of media content over the Internet or another packet switched network. Sender-originated messages may be transmitted to one or more recipients, which may be connected to a destination network via a common application. Short Messaging Service (SMS) technology provides text messaging, i.e., sending an SMS message to one or more mobile client devices over a cellular data network. Multimedia Messaging Service (MMS) technology provides a way to send messages that include multimedia content to one or more mobile client devices over a cellular data network.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Figure 1:
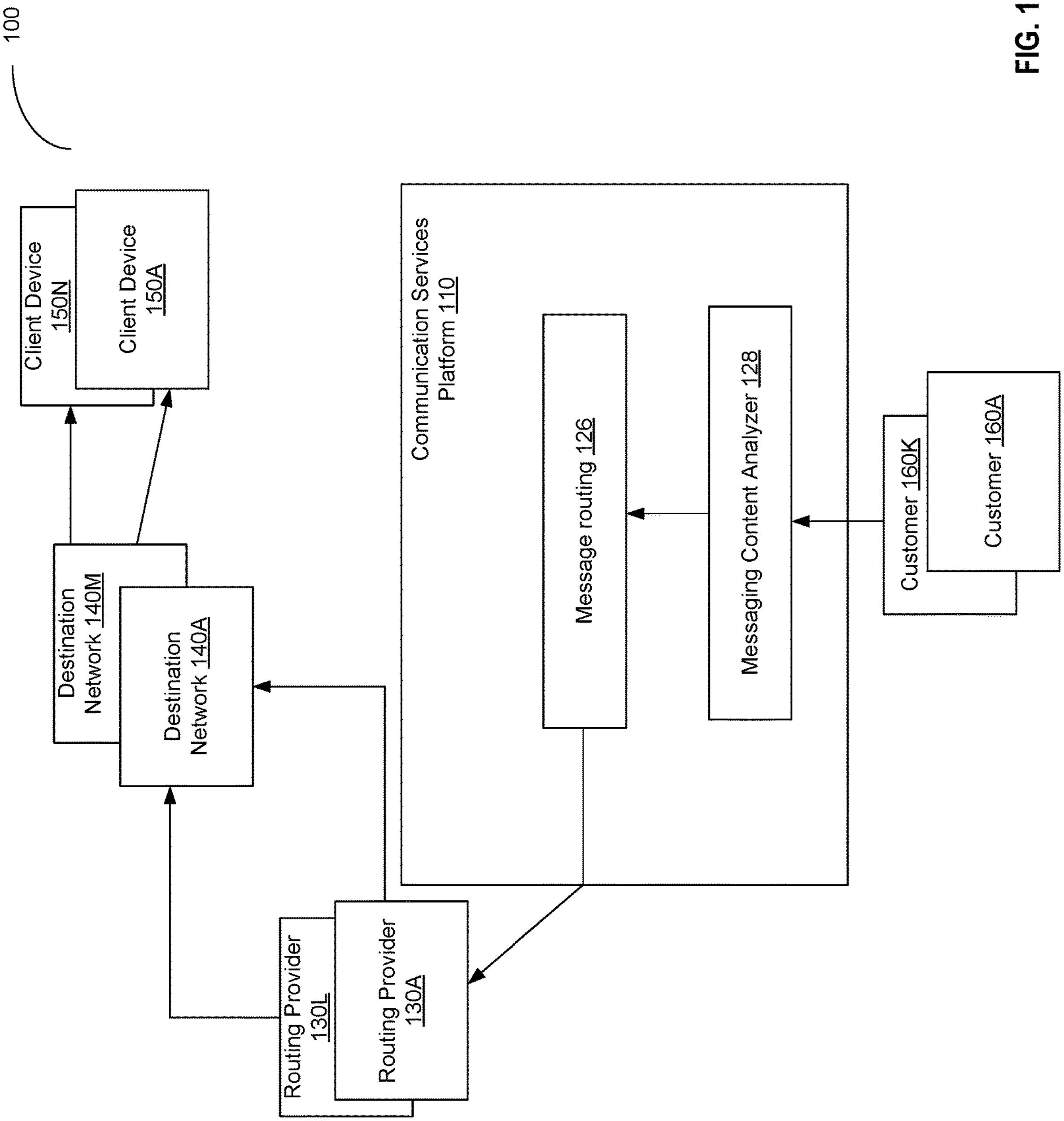
FIG. 1 illustrates an example system architecture of a communication services platform, in accordance with aspects of the disclosure.

Various organizations have been increasingly adopting messaging as a valuable tool for communications within and outside of the organization. In an example use case, an organization may use messaging to forward to client devices of its end users one-time passwords for a two-factor authentication scheme. In another example use case, an organization may use messaging to send promotional messages to client devices of its end users. In yet another example use case, an organization may use messaging to send appointment reminders to client devices of its end users and may further request the message receiver to reply to either confirm or cancel an appointment.

In these and various other use cases, organizations may employ communication services platforms, such as Software as a Service (SaaS) platforms, which facilitate sending of messages (such as SMS messages, MMS messages, and/or IM messages) generated by multiple message-originating entities (e.g., customers of the communication services platform) to recipient devices via multiple message routing providers. In an illustrative example, a message-originating entity may be identified by one or more account identifiers, communication endpoint identifiers (such as sender phone numbers), and/or other suitable identifiers. In various illustrative examples, a communication endpoint identifier may be represented by a short phone number, a 10-digit long code (10DLC) number, a toll-free number, an alphanumeric string, etc.

The communication services platform may employ one or more message routing providers for delivering messages to their respective destinations on respective destination networks. Each message routing provider may implement one or more routes to each of the destination networks served by that message routing provider. Each route may employ a specific set of communication technologies, networks, and/or configurations. Accordingly, the communication services platform may forward customer-originated messages to the message routing providers for delivery of the messages to their respective destinations.

The communication services platform and/or the message routing providers may employ various message inspection and/or filtering techniques for identifying and blocking messages that carry prohibited types of content (e.g., Sex, Hate, Alcohol, Firearms, and Tobacco (SHAFT) content) and/or phishing messages. Such message inspection and/or filtering techniques may be based on detecting "fingerprints" of prohibited content within the messages being routed, e.g., by performing regular expression matching and/or fuzzy search. However, not only such techniques require operator-assisted configuration operations (such as specifying the regular expressions to be matched), but they also may be circumvented quite easily by malicious message originating parties.

More sophisticated message filtering techniques may reply upon pre-approved use cases and/or reputation of the message originating parties. In response to such advanced techniques, malicious senders have been changing their tactics to exploit eventual deficiencies of the content filters, e.g., by taking over legitimate messaging client accounts and/or submitting false information to the communication service platform to get their use cases approved, and then sending additional non-compliant content along with the content that complies with approved use cases and/or mimics the content that was originated by the legitimate messaging client account and/or use legitimate case before the account had been taken over by the malicious party. This type of exploit is referred to herein as "content drift," to emphasize the gradual changes in the messaging content that would finally push the content outside of compliance bounds.

Systems and methods implemented in accordance with aspects of the present disclosure overcome the above-noted and other deficiencies of various content filtering solutions by inspecting the messaging content originated by the customers of the communication services platform and either allows the messaging content to be forwarded to the intended destinations or taking remedial actions if noticeable (e.g., based on configurable maximum allowed variability thresholds) content drift is detected.

In some implementations, the communication services platform may employ trainable encoder models, which may be implemented by one or more neural networks that are trained to produce numeric vectors representing the content of the messages being inspected, as described in more detail herein below.

Thus, the present disclosure addresses the technical problem of preventing prohibited content from being forwarded by a communication services platform. A technical solution to the above-identified technical problem involves detecting messaging content drift with respect to established messaging content baselines and configurable maximum allowed variability thresholds. Another technical solution to the above-identified technical problem involves employing trainable classifiers for classifying messaging content into respective use cases. Another technical solution to the above-identified technical problem involves employing trainable encoders to producing numeric representation of messaging content, as described in more detail herein below.

Thus, the technical effect includes implementing a messaging content analyzer for inspecting at least a subset of messaging traffic being forwarded via the communication services platform, as described in more detail herein below.

Various aspects of the methods and systems are described herein by way of examples, rather than by way of limitation. The systems and methods described herein may be implemented by hardware (e.g., general purpose and/or specialized processing devices, and/or other devices and associated circuitry), software (e.g., instructions executable by a processing device), or a combination thereof.

FIG. 1 illustrates an example distributed system architecture ("system") 100 implemented in accordance with aspects of the present disclosure. The distributed system architecture 100 supports a communication services platform 110, which may be implemented by one or more general purpose or specialized computing devices (such as servers), data stores (e.g., hard disks, memories, databases), networks, other hardware components that are utilized to run one or more software services, such as message routing services, and various middleware and operating systems. The computing devices may be disposed in one or more physical locations, which may include geographically distributed physical locations.

In some implementations, communication services platform 110 may implement a Software as a Service (SaaS) platform that provides messaging services for forwarding messages (such as SMS messages, MMS messages, and/or IM messages) generated by computing devices 160A-160K of message-originating entities (e.g., customers of the communication services platform) to client devices 150A-150N via a pool of message routing providers 130A-130L servicing respective destination networks 140A-140M. In some implementations, the communication services platform 110 may further provide various other services, including voice services, electronic mail services, video services, and/or chat messaging services.

The communication services platform 110 may be accessed (e.g., via one or more application programming interface (API) endpoints) by computing devices 160A-160K via a communication network, which may include one or more public networks (e.g., the Internet) and/or private networks (e.g., a local area network (LAN) or wide area network (WAN)) utilizing various physical and datalink layer technologies, such as wired networks (e.g., Ethernet network), wireless networks (e.g., an 802.11 network or a Wi-Fi network), and/or cellular networks (e.g., a Long Term Evolution (LTE) network).

A computing device 160A-160K may be represented by a general purpose or specialized computing device implementing a server running one or more applications that utilize one or more messaging technologies (such as Short Message Service (SMS) or Multimedia Messaging Service (MMS)) for communicating with client applications running on client devices 150A-150N.

A client device 150A-150N may be represented by a general purpose or specialized computing device, such as a mobile communication device (e.g., a smartphone), a portable computer (PC), a wearable device (e.g., smart watch, smart glasses, etc.), a network-connected television set, a smart appliance (e.g., a video doorbell), etc. In some implementations, a client device 150 may run one or more client applications that communicate (e.g., using one or more messaging technologies) with one or more computing device 160A-160K. In various example use cases, a client application running on a client device 150 may be a web application or a standalone application implementing a graphical user interface (GUI).

In some implementations, an API endpoint exposed by the communication services platform 110 may be accessed via a resource identifier, such a universal resource identifier (URI). The API endpoint may receive requests and return responses from/to message-originating entities (e.g., customers of the communication services platform). In various implementations, the API endpoint may implement, e.g., a REST (Representational State Transfer) API, a GraphQL API, a SOAP (Simple Object Access Protocol) API accessible via HTTP (Hypertext Transfer Protocol)/HTTPS (Hypertext Transfer Protocol Secure) or other suitable application layer protocols.

In some implementations, the API endpoint may be used for initiating a messaging request that may include one or more destination identifiers (e.g., recipient phone numbers), the message body (e.g., text and/or multimedia content), and the origin identifier (e.g., a sender phone number). In some implementations, outgoing messages may be automatically assigned an origin identified that is associated with the customer account.

Message routing providers 130A-130L that are utilized by the communication services platform 110 may employ different communication technologies, networks, and/or configurations. In an illustrative example, each message routing provider 130 may route the incoming messages to specified destinations via one or more messaging gateways (e.g., SMS gateways).

In order to meet various requirements of its customers, the communication services platform 110 may employ the message routing module 126 to dynamically allocate customer-originating messages to the available message routing providers for a specified destination network (e.g., identified by the Mobile Country Code (MCC) and Mobile Network Code (MNC)). The destination network identifier(s) may be derived from the destination phone number or other destination endpoint identifier of a message being routed.

In some implementations, the communication services platform 110 may include the messaging content analyzer 128, which inspects the messaging content received from the message-originating entities (e.g., customers of the communication services platform) and either allows the messaging content to be forwarded or takes remedial actions if significant content drift is detected. In an illustrative example, the messaging content analyzer 128 receives messages originated by the message-originating entities (e.g., customers of the communication services platform) and inspects the message content. Should no content drift be detected, the messaging content analyzer 128 allows the message routing module 126 to forward the messages to the respective message touring providers 130A-130L; conversely, should the messaging content analyzer 128 detect content drift within the messages being inspected, one or more remedial actions are taken (e.g., blocking the messages from being forwarded and/or initiating a secondary inspection of the messages).

In some implementations, the messaging content analyzer 128 may employ a trainable encoder model, which may be implemented by one or more neural networks that are trained to produce numeric vectors representing payloads of the messages being inspected, as described in more detail herein below with reference to FIG. 3.

Thus, for a given message-originating entity (e.g., a customer of the communication services platform), the messaging content analyzer 128 may inspect, over a predefined period, the messaging content originated by that message-originating entity, in order to establish the messaging content baseline against which the future messaging content will be evaluated for detecting potential drift. The messaging content baseline representing the observed messaging content may be, e.g., a numeric vector having equal cosine similarities to numeric vectors produced by the trainable encoder model for at least a subset of the inspected messages, as described in more detail herein below. "Cosine similarity" herein refers to a value computed by applying a predefined mathematical transformation to the cosine of the angle between two numeric vectors. In various illustrative example, the predefined mathematical transformation may be the identity function, a linear function, a logarithmic function, etc.

As noted herein above, message-originating entities (e.g., customers of a communication services platform) may originate messages in furtherance of multiple use cases. Accordingly, the messaging content analyzer 128 may classify the observed messaging content into one or more messaging content classes corresponding to respective use cases and may accordingly establish a respective messaging content baseline for each identified use case. In some implementations, each use case may be associated with a corresponding sender identifier (e.g., a short phone number, a 10-digit long code (10DLC) number, a toll-free number, an alphanumeric string, etc.). Alternatively, to or more use cases may share the same sender identifier.

In some implementations, the messaging content classification may be performed by trainable classifies that implements a classification layer on top of the trainable encoder model, as described in more detail herein below.

Thus, the messaging content analyzer 128 may establish messaging content baselines for all use cases of all message-originating entities. Upon establishing the messaging content baselines, the messaging content analyzer 128 may determine, for each messaging content baseline, a corresponding maximum allowable variability threshold of the messaging content.

In an illustrative example, in order to determine the maximum allowable variability threshold for a particular use case of a particular message-originating entity, the messaging content analyzer 128 may identify the maximum difference between the numeric vector representing the baseline of the messaging content associated with that use case and the numeric vector representing at least a portion of the observed messaging content associated with that use case. The difference between the numeric vectors may be represented by a chosen similarity metric. In some implementations, the chosen similarity metric may be represented by the cosine similarity.

Once the messaging content baselines and corresponding maximum allowable variability thresholds of the messaging content are established, the messaging content analyzer 128 may switch to periodically or continuously comparing the incoming messaging content to the respective messaging content baselines in order to detect potential messaging content drift. In some implementations, the messaging content analyzer 128 may inspect the messaging content in real time, which would allow immediate performance of remedial actions if non-compliant content is detected (e.g., if the value of the chosen similarity metric reflecting the difference between the numeric vectors representing a portion of the incoming messaging content comprising one or more messages and a corresponding messaging content baseline exceeds the maximum allowable variability threshold associated with the particular use case for the particular message-originating entity). The use case may be identified by a messaging content classifier, which is described in more detail herein below with reference to FIG. 3.

Conversely, should the difference between the numeric vectors representing the portion of the incoming messaging content and the corresponding messaging content baseline be below the maximum allowable variability threshold associated with the particular use case for the particular message-originating entity, the messaging content analyzer 128 may allow at least the inspected portion of the messaging content to be forwarded, by the message routing module 126, to one or more message routing providers for routing to the respective destination(s).

In some implementations, the messaging content analyzer 128 may selectively inspect the messaging content (e.g., inspect a predefined share of a portion of messaging content initiated by a particular message-originating entity) and allow or disallow the portion of the messaging content based on the result of inspecting the predefined share of the portion of messaging content.

In some implementations, the messaging content analyzer 128 may inspect the messaging content asynchronously with respect to the messaging content being forwarded to one or more message routing providers, which may result in a delayed remedial action, while flattening the peak processing capacity requirements by the messaging content analyzer 128.

In an illustrative example, the remedial actions may include prohibiting one or more messages that have been identified as non-compliant from being forwarded to respective message routing provider(s). In another illustrative example, the remedial actions may include alerting an operator and/or triggering a secondary inspection of the potentially non-compliant messaging content. In some implementations, the secondary inspection may be operator-assisted and/or fully automated (e.g., performed by one or more trainable models that utilize messaging content numeric representations of higher dimensionality or otherwise more complex trainable models as compared to the trainable models employed by the primary inspection contour). In some implementations, the remedial actions may include suspending the messaging content originated by the affected message-originating entity until the secondary inspection is completed.

In an illustrative example, the messaging content analyzer 128 may, based on the results of the remedial actions, adjust the messaging content use case classification, baselines, and/or maximum allowable variability thresholds. In some implementations, should the secondary inspection (initiated in response to the messaging content analyzer 128 detecting a content drift) find no prohibited content, the messaging content analyzer 128 may repeat the messaging content classification, baseline definition, and maximum allowable variability threshold computation operations. In another illustrative example, the messaging content analyzer 128 may, based on the results of the remedial actions, adjust parameters and/or retrain the trainable models utilized for messaging content classification and/or inspection.

Elements of FIG. 1 are used herein below in descriptions of FIGS. 2-6 to reflect and emphasize various aspects and features of the communication services platform 110 and the messaging content analyzer 128.

Figure 2:
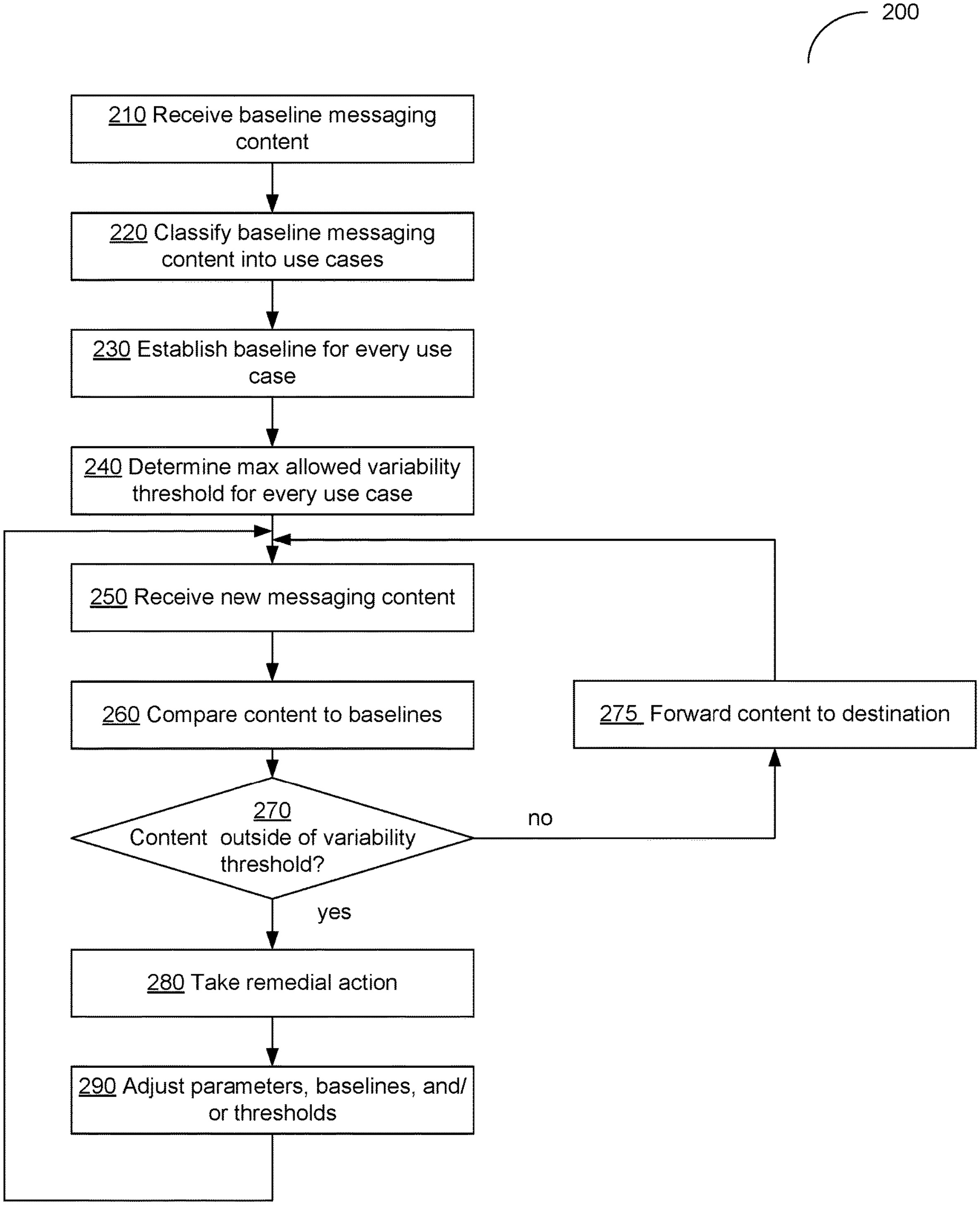
FIG. 2 is a flow diagram of an example method of analyzing messaging content, in accordance with aspects of the present disclosure.

FIG. 2 is a flow diagram of an example method 200 of analyzing messaging content originated by a message-originating entity (e.g., a customer of a communication services platform), in accordance with aspects of the present disclosure. The method 200 may be performed for each destination network that is served by the communication services platform. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the one or more modules (e.g., messaging content analyzer 128) of the communication services platform 110 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 210, the processing logic implementing the method receives the baseline messaging content of a plurality of messages originated by a particular message-originating entity. In an illustrative example, the message-originating entity may be a customer of the communication services platform. The baseline messaging content can be pre-filtered, inspected, or otherwise verified in order to ascertain the absence of prohibited content. The identifier of the message-originating entity may be an input parameter of the method. In an illustrative example, the message-originating entity may be identified by one or more account identifiers, communication endpoint identifiers (such as sender phone numbers), and/or other suitable identifiers. In some implementations, the processing logic may receive a predefined amount of the baseline messaging content. Alternatively, the processing logic may be receiving the baseline messaging content over a predefined time window. In some implementations, the processing logic may strip the received messages of all metadata, headers, etc., thus leaving only payloads (i.e., texts of messages) for further processing.

At operation 220, the processing logic classifies the baseline messaging content into one or more messaging content classes corresponding to respective use cases. In some implementations, the messaging content classification may be performed by a classification layer residing on top of the trainable encoder model.

At operation 230, the processing logic establishes, for each subset of the messaging content corresponding to a respective use case, a corresponding baseline. In an illustrative example, the messaging content baseline representing the observed messaging content may be, e.g., a numeric vector having equal cosine similarities to numeric vectors produced by the trainable encoder model for at least a predefined share of the total number of messages included into the subset of messaging content associated with a particular use case.

At operation 240, the processing logic determines, for each use case, a corresponding maximum allowable variability threshold of the messaging content. In an illustrative example, the messaging content analyzer 128 may, for each use case, identify the maximum difference between the numeric vector representing the baseline of the messaging content associated with that use case and the numeric vector representing at least a portion of the received messaging content associated with that use case. The maximum can be sought among the numeric vectors representing respective portions of the received messaging content. The difference between the numeric vectors may be represented by a chosen similarity metric, e.g., the cosine similarity.

At operation 250, the processing logic receives a new (e.g., live) messaging content comprising a plurality of one or more messages originated by the message-originating entity. In an illustrative example, the processing logic may inspect at least a predefined share of the total messaging content originated the message-originating entity over a predefined period. Accordingly, the processing logic may identify a subset of the new messaging content to be inspected (e.g., by randomly selecting, from the new messaging content, at least a certain number of messages that corresponds to the predefined share of the total messaging content). In some implementations, the processing logic may strip the received messages of all metadata, headers, etc., thus leaving only payloads (i.e., texts of messages) for further processing.

At operation 260, the processing logic compares the identified subset of the new messaging content to the respective baselines associated with the use cases of the message-originating entity. The processing logic may then classify, into one or more portions corresponding to respective use cases, the messages comprised by the subset of the new messaging content. The classification may be performed by a messaging content classifier, which is described in more detail herein below with reference to FIG. 3. The processing logic may then compute, for each portion of the subset of the new messaging content, the value of a metric reflecting the difference between the portion of the subset of the new messaging content and the baseline associated with the corresponding use case. In an illustrative example, the metric may be represented by the cosine similarity.

Responsive to determining, at operation 270, that the computed value of the metric reflecting the difference between the portion of the subset of the new messaging content and the baseline associated with the corresponding use case exceeds the corresponding maximum allowable variability threshold, the processing continues at operation 280; otherwise, the method branches to operation 275.

At operation 275, which is performed responsive to determining, at operation 270, that the computed value of the metric does not exceed the corresponding maximum allowable variability threshold, the processing logic forwards the message being analyzed to its destination (e.g., via a message routing provider). The method then loops back to operation 250.

At operation 280, which is performed responsive to determining, at operation 270, that the computed value of the metric exceeds the corresponding maximum allowable variability threshold, the processing logic performs one or more remedial actions responsive to detecting the potentially non-compliant messaging content. In an illustrative example, the remedial actions may include prohibiting, from being forwarded to respective message routing provider, one or more messages for which the computed value of the metric reflecting the difference between the message being analyzed and the baseline associated with the corresponding use case exceeds the corresponding maximum allowable variability threshold. In another illustrative example, the remedial actions may include alerting an operator and/or otherwise triggering a second level (i.e., more thorough) inspection of these potentially non-compliant messages and/or other messaging content originated by the same message-originating entity. Alerting the operator may involve sending a message to an operator-monitored messaging account, displaying a message via a graphical user interface (GUI) implementing an incident dashboard, etc. In some implementations, the secondary inspection may be operator-assisted and/or artificial intelligence (AI)-assisted. In some implementations, the remedial actions may include suspending the messaging traffic originated by the same message-originating entity until the secondary inspection is completed.

At operation 290, the processing logic may, based on the results of the remedial actions performed at operation 280, adjust the messaging content use case classification, baselines, and/or maximum allowable variability thresholds. In some implementations, should the secondary inspection (initiated in response to detecting a content drift) find no prohibited content, the processing logic may repeat the messaging content classification, baseline definition, and maximum allowable variability threshold computation operations 230-240 using a different set of baseline content (e.g., the original baseline content and at least part of the new messaging content). In another illustrative example, the professing logic may, based on the results of the remedial actions, adjust parameters and/or retrain the models utilized for messaging content classification and/or inspection. Responsive to completing the operation 290, the method may loop back to operation 250.

Figure 3:
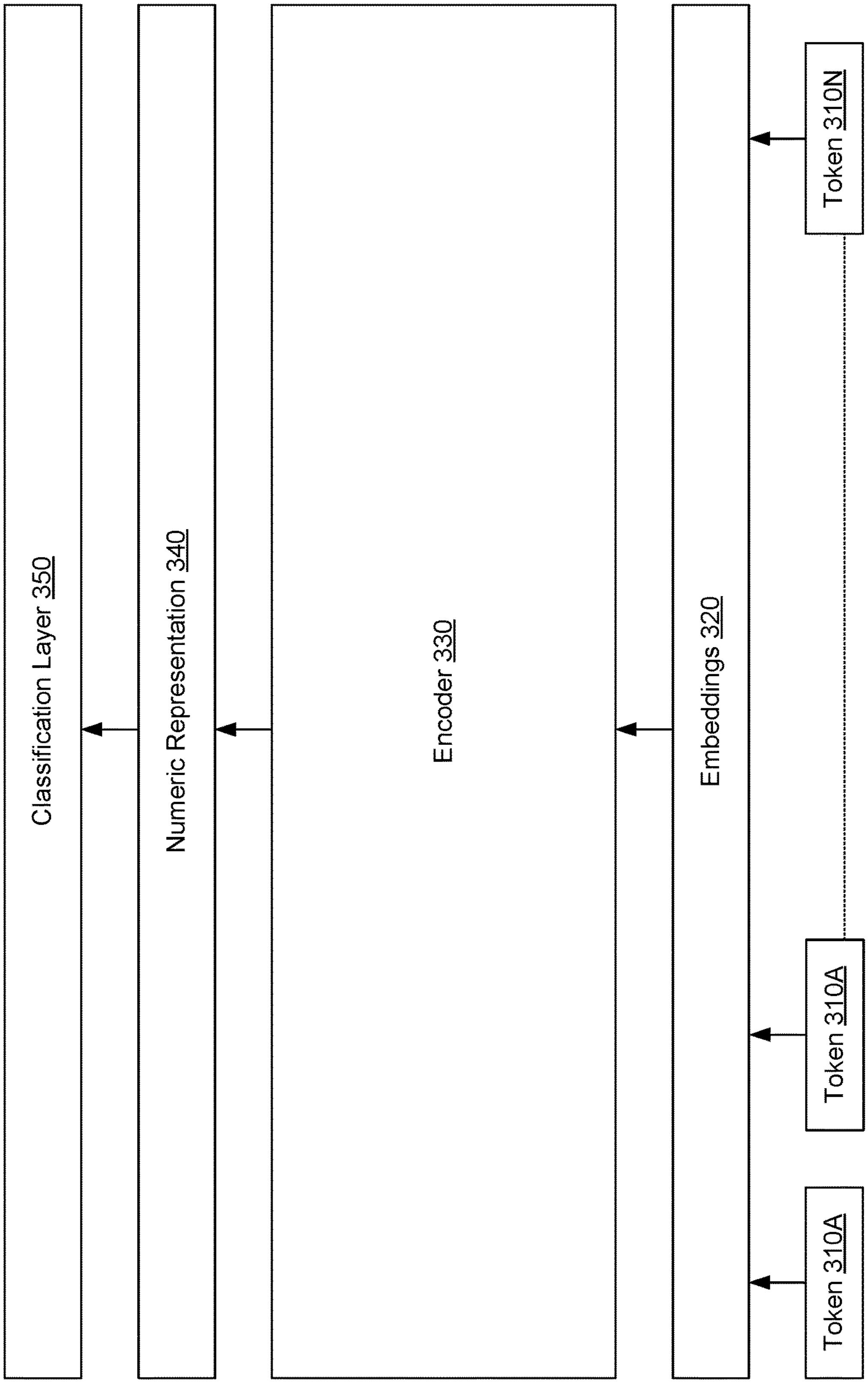
FIG. 3 schematically illustrates a trainable encoder and classifier model utilized by a messaging content analyzer implemented in accordance with aspects of the present disclosure.

FIG. 3 schematically illustrates a trainable encoder and classifier model utilized by a messaging content analyzer implemented in accordance with aspects of the present disclosure. As schematically illustrated by FIG. 3, the sequence of input tokens 310A-310N is transformed into respective embeddings 320, which are then fed to the encoder 330. Each input token 310A-310N may be represented by one or more words, which may be pre-processed, e.g., by being stripped of capitalization, punctuation, removal of suffixes, etc. Word embeddings represent each input token as a respective numeric vector in a predefined vector space, such that similarly used words would have similar (as reflected by the chosen similarity metric) numeric representations, thus capturing their semantics and grammatical features.

The encoder 330, which may be represented by a neural network, produces numeric representations 340 of input sequences of tokens 310A-310N, based on bi-directional contexts of each input token 310A-310N. The encoder 330 is trained to produce similar (as reflected by the chosen similarity metric) numeric representations of semantically similar input sequences, which allows effectively using the numeric representations produced by the encoder 330 for detecting content drift by the messaging content analyzer 128, as described in more detail herein above.

In an illustrative example, the encoder may implement Bidirectional Encoder Representations from Transformers (BERT) language model, which is based on the transformer architecture. In another illustrative example, the encoder may implement a Sentence-BERT (SBERT) model. In yet another illustrative example, the encoder may implement Masked and Permuted Network (MPNet) model.

A classification layer 350 (e.g., represented by a neural network) may be added on top of the encoder 330 in order to classify the input sequences into one or more categories based on their semantic meanings, which allows effectively using the classifications produced by the classification layer 350 for classifying the input messaging content into one or more use cases by the messaging content analyzer 128, as described in more detail herein above.

Figure 4:
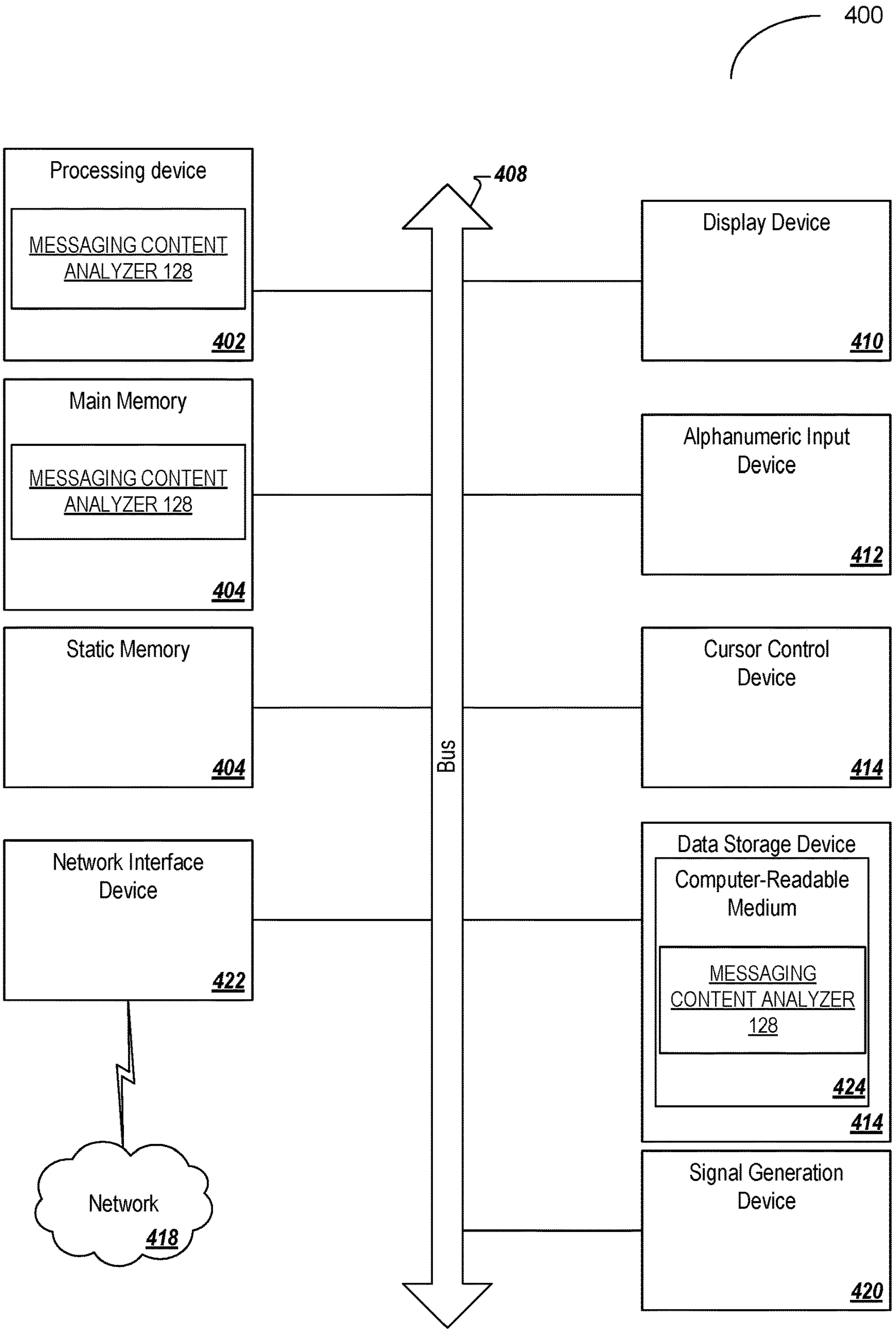
FIG. 4 is a block diagram illustrating an exemplary computer system, in accordance with some implementations of the disclosure.

FIG. 4 is a block diagram illustrating an exemplary computer system 400, in accordance with an implementation of the disclosure. The computer system 400 executes one or more sets of instructions that cause the machine to perform any one or more of the methods discussed herein. Set of instructions, instructions, and the like may refer to instructions that, when executed by computer system 400, cause computer system 400 to perform one or more operations of one or more modules (e.g., messaging content analyzer 128) of the communication services platform 110 of FIG. 1. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methods discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 404 (e.g., flash memory, static random access memory (SRAM), etc.), and a data storage device 414, which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions of one or more modules (e.g., messaging content analyzer 128) of the communication services platform 110 of FIG. 1 for performing the operations discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 414 may include a non-transitory computer-readable storage medium 424 on which is stored the sets of instructions of one or more modules (e.g., messaging content analyzer 128) of the communication services platform 110 of FIG. 1 implementing the methods described herein. The sets of instructions of one or more modules (e.g., messaging content analyzer 128) of the communication services platform 110 of FIG. 1 may also reside, completely or at least partially, within the main memory 404 and/or within the processing device 402 during execution thereof by the computer system 400, the main memory 404 and the processing device 402 also constituting computer-readable storage media. The sets of instructions may further be transmitted or received over the network 418 via the network interface device 422.

While the example of the computer-readable storage medium 424 is shown as a single medium, the term "computer-readable storage medium" may include a single medium or multiple media (e.g., a centralized or distributed database, and/or associated caches and servers) that store the sets of instructions. The term "computer-readable storage medium" may include any medium that is capable of storing, encoding or carrying a set of instructions for execution by the machine and that causes the machine to perform any one or more of the methods of the disclosure. The term "computer-readable storage medium" may include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:

receiving, by a processing device, first messaging content comprising a first plurality of messages originated by a specified message-originating entity;

determining, for each subset of the first messaging content corresponding to a respective use case, a respective baseline represented by a corresponding numeric vector of a first plurality of numeric vectors, the corresponding numeric vector having equal cosine similarities to other numeric vectors of the first plurality of numeric vectors, the other numeric vectors representing respective messages comprised by a respective subset of the first messaging content;

receiving a second messaging content comprising a second plurality of messages originated by the specified message-originating entity;

classifying the second messaging content into respective one or more portions corresponding to one or more use cases associated with the specified message-originating entity;

comparing each portion of the second messaging content to a baseline associated with a corresponding use case;

responsive to determining that a value of a metric reflecting a difference between a portion of the second messaging content and the baseline associated with the corresponding use case exceeds a corresponding maximum allowable variability threshold, suspending a third messaging content originated by the specified message-originating entity until a secondary inspection of the portion of the second messaging content is completed, wherein the secondary inspection is performed by a neural network utilizing a second plurality of numeric vectors, each numeric vector of the second plurality of numeric vectors having a second dimensionality that exceeds a first dimensionality of a first numeric vector of the first plurality of numeric vectors.

2. The method of claim 1, wherein determining, for each subset of the first messaging content corresponding to a respective use case, a respective baseline further comprises:

classifying the subset of the first messaging content into one or more use cases.

3. The method of claim 1, further comprising:

responsive to determining that the value of the metric reflecting the difference between the portion of the second messaging content and the baseline associated with the corresponding use case does not exceed the corresponding maximum allowable variability threshold, forwarding one or more messages comprised by the portion of the second messaging content to respective destinations.

4. The method of claim 1, wherein the value of the metric reflecting the difference between the portion of the second messaging content and the baseline associated with the corresponding use case is computed by an encoder implemented by one or more neural networks.

5. The method of claim 1, wherein a maximum allowable variability threshold associated with a particular use case is represented by the maximum difference between a first numeric vector representing a baseline associated with the particular use case and a second numeric vector representing at least a portion of the first messaging content associated with the particular use case.

6. The method of claim 1, wherein suspending the third messaging content further comprises:

prohibiting one or more messages comprised by the portion of the second messaging content from being forwarded to respective destinations.

7. The method of claim 1, further comprising:

adjusting, using a fourth messaging content comprising a fourth plurality of messages originated by the specified message-originating entity, for each use case, a respective baseline.

8. The method of claim 1, further comprising:

adjusting, using a fourth messaging content comprising a fourth plurality of messages originated by the specified message-originating entity, for each use case, a corresponding maximum allowable variability threshold.

9. The method of claim 1, further comprising:

adjusting one or more parameters of an encoder utilized for computing the value of the metric reflecting the difference between the portion of the second messaging content and the baseline associated with the corresponding use case.

10. The method of claim 1, wherein the specified message-originating entity is represented by a customer of a communication services platform.

11. The method of claim 1, wherein the specified message-originating entity is associated with one or more communication endpoint identifiers.

12. A system, comprising:

a memory; and a processing device, coupled to the memory, the processing device configured to:

receive a first messaging content comprising a first plurality of messages originated by a specified message-originating entity;

determine, for each subset of the first messaging content corresponding to a respective use case, a respective baseline represented by a corresponding numeric vector of a first plurality of numeric vectors, the corresponding numeric vector having equal cosine similarities to other numeric vectors of the first plurality of numeric vectors, the other numeric vectors representing respective messages comprised by a respective subset of the first messaging content;

receive a second messaging content comprising a second plurality of messages originated by the specified message-originating entity;

classify the second messaging content into respective one or more portions corresponding to one or more use cases associated with the specified message-originating entity;

compare each portion of the second messaging content to a baseline associated with a corresponding use case;

responsive to determining that a value of a metric reflecting a difference between a portion of the second messaging content and the baseline associated with the corresponding use case exceeds a corresponding maximum allowable variability threshold, suspend a third messaging content originated by the specified message-originating entity until a secondary inspection of the portion of the second messaging content is completed, wherein the secondary inspection is performed by a neural network utilizing a second plurality of numeric vectors, each numeric vector of the second plurality of numeric vectors having a second dimensionality that exceeds a first dimensionality of a first numeric vector of the first plurality of numeric vectors.

13. The system of claim 12, wherein the processing device is further configured to:

responsive to determining that the value of the metric reflecting the difference between the portion of the second messaging content and the baseline associated with the corresponding use case does not exceed the corresponding maximum allowable variability threshold, forward one or more messages comprised by the portion of the second messaging content to respective destinations.

14. The system of claim 12, wherein a maximum allowable variability threshold associated with a particular use case is represented by the maximum difference between a first numeric vector representing a baseline associated with the particular use case and a second numeric vector representing at least a portion of the first messaging content associated with the particular use case.

15. A non-transitory computer-readable storage medium comprising executable instructions that, responsive to execution by a processing device, cause the processing device to:

receive a first messaging content comprising a first plurality of messages originated by a specified message-originating entity;

determine, for each subset of the first messaging content corresponding to a respective use case, a respective baseline represented by a corresponding numeric vector of a first plurality of numeric vectors, the corresponding numeric vector having equal cosine similarities to other numeric vectors of the first plurality of numeric vectors, the other numeric vectors representing respective messages comprised by a respective subset of the first messaging content;

receive second messaging content comprising a second plurality of messages originated by the specified message-originating entity;

classify the second messaging content into respective one or more portions corresponding to one or more use cases associated with the specified message-originating entity;

compare each portion of the second messaging content to a baseline associated with a corresponding use case;

responsive to determining that a value of a metric reflecting a difference between a portion of the second messaging content and the baseline associated with the corresponding use case exceeds a corresponding maximum allowable variability threshold, suspending third messaging content originated by the specified message-originating entity until a secondary inspection of the portion of the second messaging content is completed, wherein the secondary inspection is performed by a neural network utilizing a second plurality of numeric vectors, each numeric vector of the second plurality of numeric vectors having a second dimensionality that exceeds a first dimensionality of a first numeric vector of the first plurality of numeric vectors.

16. The non-transitory computer-readable storage medium of claim 15, further comprising executable instructions that, responsive to execution by the processing device, cause the processing device to:

responsive to determining that the value of the metric reflecting the difference between the portion of the second messaging content and the baseline associated with the corresponding use case does not exceed the corresponding maximum allowable variability threshold, forward one or more messages comprised by the portion of the second messaging content to respective destinations.

17. The non-transitory computer-readable storage medium of claim 15, further comprising executable instructions that, responsive to execution by the processing device, cause the processing device to:

adjust, using a fourth messaging content comprising a fourth plurality of messages originated by the specified message-originating entity, for each use case, a corresponding maximum allowable variability threshold.

* * * * *